United States Patent [19]

Jonasson et al.

[11] Patent Number: 5,732,437
[45] Date of Patent: Mar. 31, 1998

[54] WIPER BLADE APPARATUS

[76] Inventors: Hans Jonasson, Rubinvägen 29, 852 39 Sundsvall; Verner Andersson, Box 134, 824 23 Hudiksvall, both of Sweden

[21] Appl. No.: 774,351

[22] Filed: Dec. 28, 1996

[30] Foreign Application Priority Data

Jan. 3, 1996 [SE] Sweden ................... 96-00025

[51] Int. Cl.⁶ ................... B60S 1/28; B60S 1/38
[52] U.S. Cl. ................... 15/250.201; 15/250.41; 15/250.22; 15/250.38; 15/250.43
[58] Field of Search ................... 15/250.38, 250.39, 15/250.4, 250.41, 250.22, 250.48, 250.43, 250.44, 250.31, 250.201

[56] References Cited

U.S. PATENT DOCUMENTS

| | | | |
|---|---|---|---|
| 2,593,073 | 4/1952 | Trevaskis | 15/250.38 |
| 2,607,066 | 8/1952 | Morton | 15/250.22 |
| 2,659,097 | 11/1953 | Morton | 15/250.38 |
| 2,712,146 | 7/1955 | Wise | 15/250.43 |
| 2,787,803 | 4/1957 | Cella | 15/250.22 |
| 3,107,384 | 10/1963 | Wise | 15/250.43 |
| 3,132,367 | 5/1964 | Wise | 15/250.43 |
| 3,139,644 | 7/1964 | Smith | 15/250.22 |
| 3,892,006 | 7/1975 | Yasumoto | 15/250.4 |
| 5,592,715 | 1/1997 | Yoshida et al. | 15/250.38 |

FOREIGN PATENT DOCUMENTS

| | | | |
|---|---|---|---|
| 2482540 | 11/1981 | France | 15/250.43 |
| 935297 | 11/1955 | Germany | 15/250.38 |
| 1 099 375 | 2/1961 | Germany | |
| 81 149 | 12/1932 | Sweden | |
| 82 108 | 4/1933 | Sweden | |
| 97 666 | 5/1938 | Sweden | |
| 133 096 | 10/1948 | Sweden | |
| 150 062 | 6/1953 | Sweden | |
| 149 063 | 7/1953 | Sweden | |
| 154 320 | 9/1954 | Sweden | |
| 165 236 | 9/1958 | Sweden | |
| 187 704 | 9/1963 | Sweden | |
| 197 191 | 12/1964 | Sweden | |
| 197 811 | 1/1965 | Sweden | |
| 300 563 | 4/1968 | Sweden | |
| 187 307 | 8/1993 | Sweden | |
| 433467 | 8/1935 | United Kingdom | 15/250.39 |

*Primary Examiner*—Gary K. Graham
*Attorney, Agent, or Firm*—Fasth Law Firm

[57] ABSTRACT

The wiper blade apparatus includes an elongate blade element for wiping a surface. The blade element has opposite end portions. First and second attachment mechanisms are attached to the end portions of the blade element. The first attachment mechanism is disposed a blade distance from the second attachment mechanism. A holding member is in operative engagement with the blade element and the holding member has opposite end portions. The holding member is bow shaped and has a bendable and spring biased segment. Third and fourth attachment mechanisms are attached to the end portions of the holding member and the third attachment mechanism is disposed a holder distance from the fourth attachment mechanism. The first attachment mechanism is in operative engagement with the third attachment mechanism and the second attachment mechanism is in operative engagement with the fourth attachment mechanisms so that the blade element is removably attached to the holding member. The holder distance is greater than the blade distance so that the blade element is subjected to a tensile force when the first attachment mechanism of the blade element is attached to the third attachment mechanism of the holding member and the second attachment mechanism of the blade element is attached to the fourth attachment mechanism of the holding member.

9 Claims, 4 Drawing Sheets

WIPER BLADE APPARATUS

TECHNICAL FIELD

The present invention is generally related to a wiper blade apparatus and more specifically it is related to an apparatus having an elongate blade element for wiping a surface. The blade element is movably attached and has attachment mechanisms disposed at each end of the blade element so that the blade element is attachable to a holding member at each end of the holding member.

A feature of the present invention is that the attachment mechanisms of the blade element and the attachment mechanism of the holding members cooperate so that the blade member is releasably attached to the holding member and the holding member applies a tensile force along the longitudinal axis of the blade element when the blade element is attached to the holding member.

BACKGROUND AND SUMMARY OF THE INVENTION

Wiper blade apparatuses are previously known to have been produced in a variety of ways. Particularly, it is known to provide the blade element of the wiper blade apparatus with a longitudinally oriented tensile force as shown in U.S. Pat. No. 3,392,425 wherein the holding member is provided with an internal spring biased member that counteracts the attachment mechanism of the holding member. The attachment mechanism of the holding member are biased away from one another and the end portions of the blade element cooperate with a metal member to which the blade element is attached.

An alternative embodiment is shown and described in U.S. Pat. No. 2,167,207.

It is also known to provide a wiper blade apparatus with a plurality of bow shaped biasing members that press the blade element against the windshield so that the forces that longitudinally affect the blade element are varied even though the blade element is attached to a bendable member.

The experience shows that the above described constructions are difficult to use to wipe areas of the wind shield that are heavily curved.

Considering the prior art, as described above, it should be apparent that it is a technical problem to construct a simple wiper blade apparatus that has a blade element that is subjected to a longitudinally oriented tensile force and that provides good wiping characteristics without having to use internal and separate spring units and/or to attach the blade element to a bendable member.

It is also a technical problem to realize the advantages of permitting the holding member to have the shape of a bow shaped and bendable spring member and to realize the importance of adjusting the distance between the attachment mechanisms of the holding member in such a way that the distance between the attachment mechanisms of the holding member is greater than the distance between the attachment mechanism of the blade element. In this way, the wiper blade is subjected to a tensile force and is in good contact with the area to be wiped even though this surface may be curved and wherein the end portions of the blade element cooperate with a metal member to which the blade element is attached.

It must also be considered a technical problem to realize the importance and the advantages of permitting the arm attached to the holding member to be bendable and spring biased so that the spring forces are applied against the windshield surface to wiped and the spring forces cooperate with the holding member so that the spring forces simultaneously apply tensile forces to the blade element and a suitable pressure against the windshield surface is provided.

It is also a technical problem to realize the importance of being able to adjust the desired tensile forces by providing the holding member with a more bendable zone.

It is also a technical problem to realize the importance of provide the holding member with two or more bendable zones so that one zone is disposed on each side of the attachment point of the arm to the holding member.

It is also a technical problem to realize the importance of providing the blade element with two or three blade edges that are distributed about the longitudinal axis of the blade element of the wiper blade apparatus as described above. The blade element may have a central portion and a plurality of blade edges extending therefrom.

In particular, the application of using a central portion as described in the latter paragraph, it is a technical problem to realize the importance of permitting the number of blade edges to be between four and ten, preferably six or eight.

It is also a technical problem to realize the importance of permitting the blade element to have a core that is embedded in a material such as rubber, plastic or a similarly material that is adapted to absorb the tensile forces applied thereto.

To be able to solve one or more of the above described technical problems, the present invention assumes that the wiper blade apparatus has a movable blade element having that is elongate. The blade element has a wiping surface adapted to wipe surfaces. The end portions of the holding member has attachment mechanisms and the end portions of the blade element have attachment mechanisms that are adapted to cooperate therewith so that the blade element may be removably attached to the holding member and the holding member is adapted to apply tensile forces to the longitudinal direction of the blade element.

According to the wiper blade apparatus of the present invention, the holding member is a bow shaped and bendable spring biased segment. The distance between the attachment mechanisms of the holding member is greater than the distance between the attachment mechanisms of the blade element so that a tensile force is applied to the blade element when the blade element is attached to the holding member.

According to the present invention, a spring biased arm is attached to and cooperates with the holding member so that the spring force provides for an increased tensile force and a higher pressure of the blade element against the surface.

According to the present invention, the holding member is provided with an easily bendable zone.

The holding member may include two or many easily bendable zones so that the zones are disposed on each side of an attachment point of the arm to the holding member.

The present invention also discloses a blade element that has two or three blade edges that are distributed about a longitudinal axis of the blade element.

Furthermore, the blade element has a central portion and blade edges that are evenly distributed about the central portion.

The number of blade edges may be between four and ten, preferably six or eight.

In particular, the blade element may have a core that is embedded in rubber, plastic or any suitable material that is adapted to withstand the above mentioned tensile forces.

Advantages of construction a wiper blade apparatus according to the present invention is that the blade element and the holding member are simple to manufacture and it is possible to apply a suitable tensile force to the longitudinal direction of the blade element so that the blade element may be made very flexible to allow the blade element to follow the curvature of the windshield.

BRIEF DESCRIPTION OF THE DRAWINGS

Some of the presently shown embodiments disclose the significant features of the present invention and the applicable wiper blade apparatus is shown in more details in the attached drawings wherein.

DETAILED DESCRIPTION OF PREFERRED EMBODIMENTS

Figure 1:
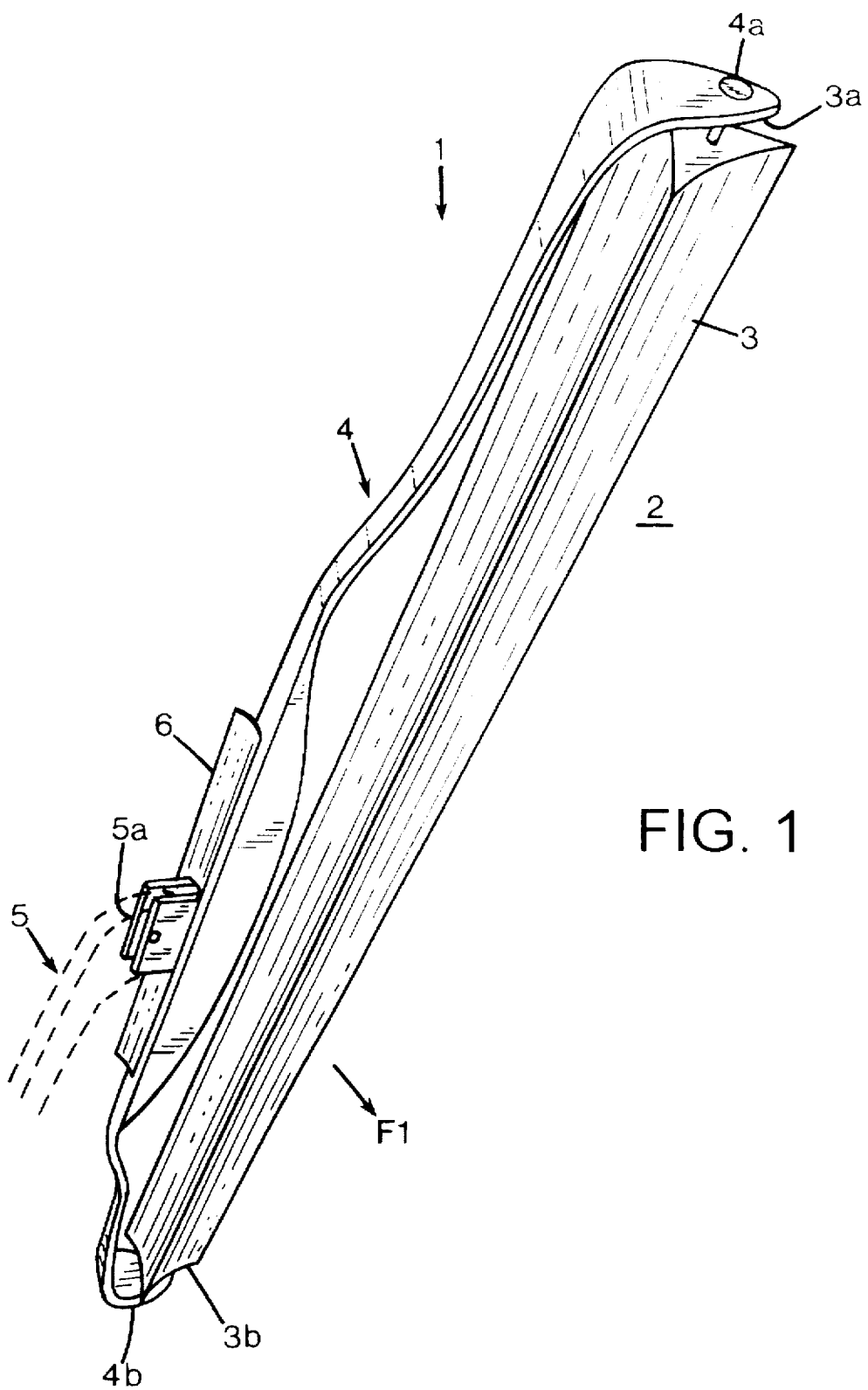
FIG. 1 is a perspective view of a first embodiment of the wiper blade apparatus of the present invention.

With reference to FIG. 1, a perspective view of the first embodiment of the wiper blade apparatus 1 of the present invention is shown. The apparatus a movably attached elongate blade element 3 having attachment mechanisms 3a, 3b at each end thereof for wiping a surface 2. A holding member 4 having attachment mechanisms 4a, 4b is adapted to cooperate with the attachment mechanisms 3a, 3b of the blade element.

The corresponding attachment mechanisms 3a, 4a and 3b, 4b, respectively, are attached to one another but are easily removable and are adapted to apply tensile forces along the longitudinal direction of the elongate blade element 3. The use of a holding member is already know and is not described in detail.

The above mentioned holding member 4 is designed to have a bow-shaped bent spring unit and the distance between the attachment mechanisms 4a and 4b is greater than the distance between the attachment mechanisms 3a and 3b of the blade element, as shown in FIG. 1.

The above mentioned distance is preadjusted so that a predetermined tensile force is applied to the blade element. This tensile force is not only dependent upon the distance between the attachment mechanisms of the holding member but also on the construction of the holding member itself and the effect of the spring forces provided by the arm 5. This is described in more detail below with reference to FIG. 7.

The arm 5 that cooperates with the holding member is of a character that is previously known and is only shown in dashed lines in FIG. 1. This arm is spring biased with a force that is directed in the "F1" direction and the arm operatively engages the holding member to that the spring biased force not only provides a high tensile force on the blade element 3 but also provide a suitably distributed pressure of the blade element against the surface 2.

Figure 2:
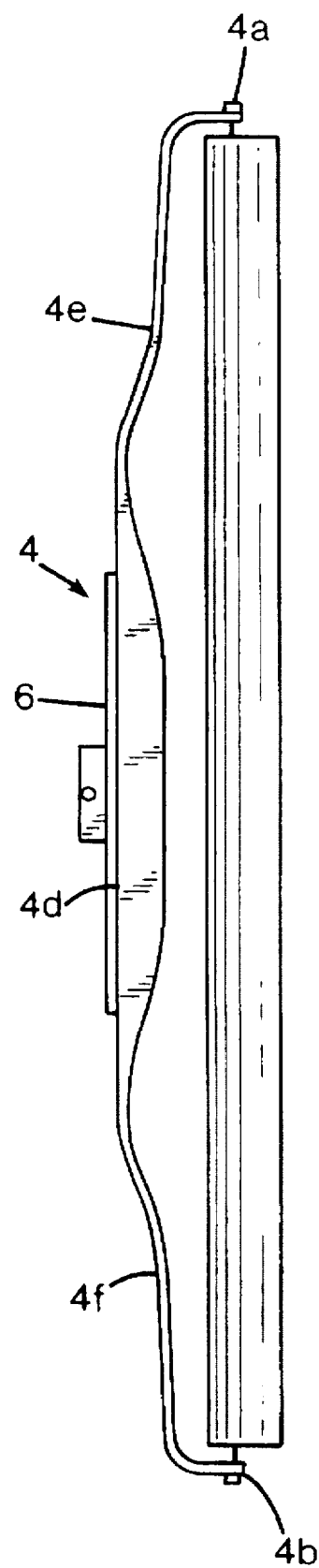
FIG. 2 is a side view of the apparatus shown in FIG. 1.

FIG. 2 shows that the holding member 4 includes a middle part 4d that has a length that is between 25% and 60% of the distance between the attachment mechanisms 4a and 4b and has a stiff section.

The stiff section 4d cooperates with the spring biased and bendable sections 4e, 4f and is preferably oriented so that the lengths of the sections 4e and 4f are the same. The bendability is adjusted to a plane extending through the holding member 4 and the blade element 3 and the holding member is stiff in a direction that is perpendicular to this plane.

Figure 3:
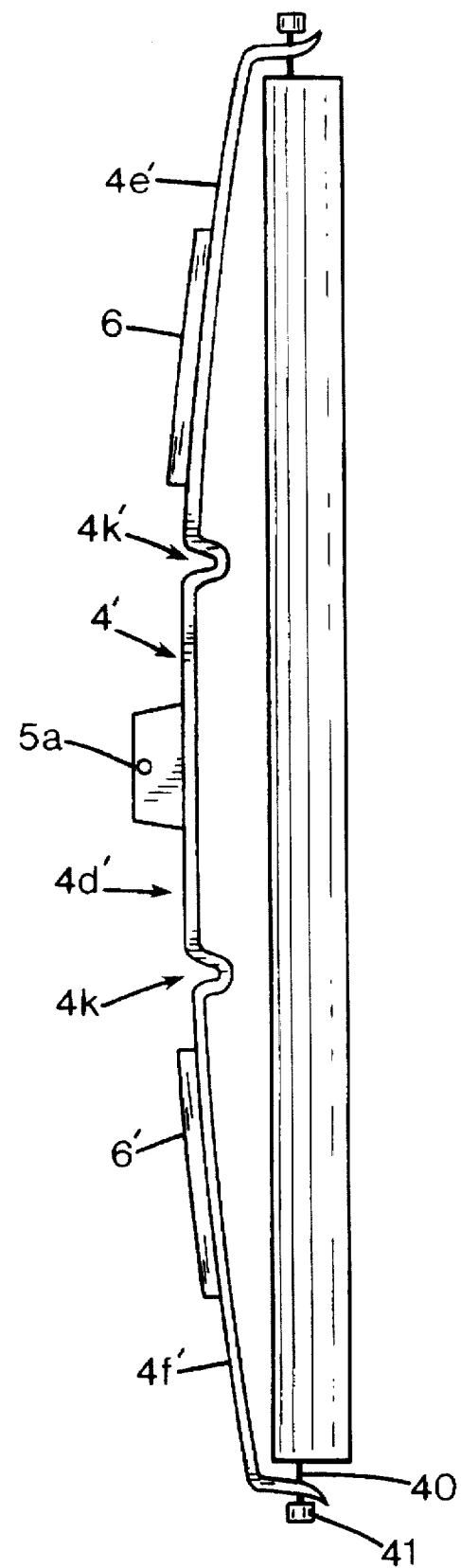
FIG. 3 is a side view of a second embodiment of the wiper blade apparatus of the present invention.

With reference to FIG. 3, a second embodiment of the present invention is shown wherein the holding member 4' has been provided with an easily bendable zone 4k.

In the embodiment shown in FIG. 3, the middle portion 4d' is slightly shorter than the portion shown in FIG. 1 and the spring biased portions 4e' and 4f' are provided with wind members 6, 6'.

The holding member may be provided with two or more easily bendable zones 4k, 4k' and each such zone should be disposed on each side of the attachment point of the arm 5a on the holding member 4.

The blade element 3 of the present invention may have two or three blade edges that are disposed about a longitudinal axis of the blade element. In particular, the blade element may include a central portion that has blade edges that are evenly distributed about the central portion.

In the latter embodiment, the number of blade edges should be between four and ten, preferably six or eight.

The blade element includes a core that is embedded in rubber, plastic or any other suitable material that is adapted to absorb the tensile forces applied thereto.

Figure 4:
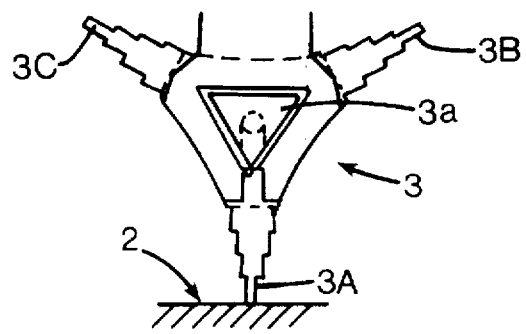
FIG. 4 is a cross sectional view of the first embodiment of a blade element.
Figure 5:
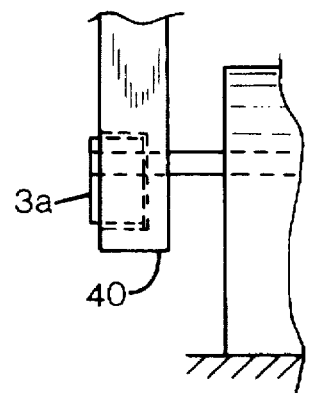
FIG. 5 shows the attachment of the blade element to the holding member.

With reference to FIGS. 4 and 5, a side view and a cross sectional view are shown of the first embodiment of the blade element 3.

The blade element 3 has three blade edges 3A, 3B and 3C that may have a shape that is different from the shape shown.

The blade edge 3A may rest against the windshield 2 but with the help of the triangular shaped attachment mechanism, the blade edges 3B or 3C may be turned into the position of the blade edge 3A.

The attachment mechanism 3a includes a triangular shaped unit that is attached to an axle and the attachment mechanism 4a includes a triangular shaped cavity having a dimension that is adapted to receive the attachment mechanism 3a.

Figure 6:
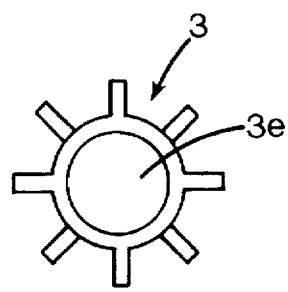
FIG. 6 is a cross sectional view of a second embodiment of the blade element of the present invention.

FIG. 6 shows a second embodiment of the blade element of the present invention. A core 3e is embedded in a rubber material or a similar material having eight distributed blade edges extending radially outwardly.

The blade element 3 has here the shape of a roller with elongate wall members attached thereto.

The attachment mechanisms 3a, 4a and 3b, 4b, respectively, may be shaped so that during each turn thereof, the roll is turned to be close to the adjacent the wall member. A plurality of wall members increase the life of the blade and the rotation of the blade ensures that particles that have been removed remain at the end portions of the blade element. It may here be an opportunity to add water between two or many wall members.

With reference to FIG. 1, a wind member 6 is disposed adjacent the attachment point 5a of the arm 5. The wind member 6 is easily attached to a rail disposed thereon.

FIG. 3 shows that the attachment between the blade element 3 and the holding member 4' is adjustable via a threaded bar 40 and a nut 41 or a similar device that is in operative engagement with the bar.

Because the holding member is dimensioned to longitudinally stretch the wiper blade element, the pressure per length unit is suitably adjusted and even wiping may be performed and any tendency to freeze to the windshield is substantially reduced.

Figure 7:
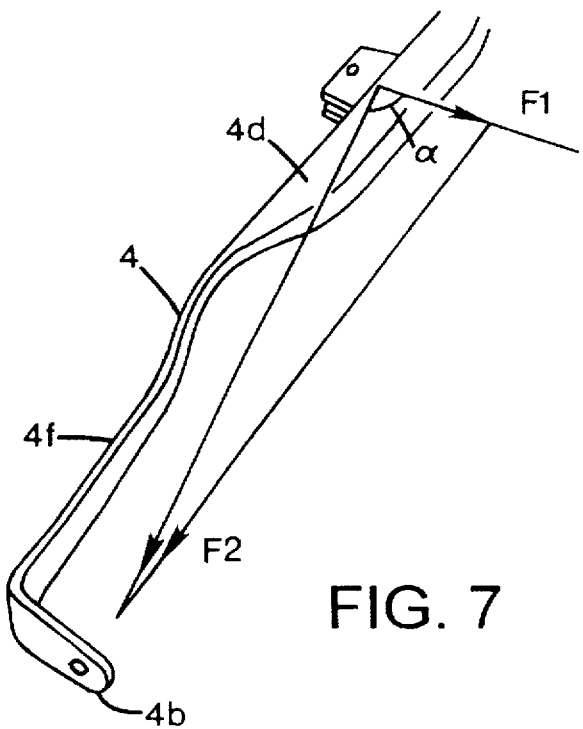
FIG. 7 shows the distribution of pressure provided by a holding arm.

With reference to FIG. 7, it is apparent that the force F1, through the shape of the holding member 4, may create a great tensile force F2 into the blade element and by choosing the angle a to be large, preferably close to 90°, the tensile force F2 is larger.

The invention is obviously not limited to the above examples of embodiments but can be modified within the scope of the concept of the invention, as illustrated in the following claims.

We claim:

1. A wiper blade apparatus adapted to wipe a surface, comprising:

an elongate blade element having opposite end portions, the blade element having a longitudinal axis and at least two rotatable blade edges evenly distributed about the longitudinal axis;

first and second attachment mechanisms attached to the end portions of the blade element, the first attachment mechanism being disposed a blade distance from the second attachment mechanism;

a holding member in operative engagement with the blade element, the holding member having opposite end portions, the holding member being bow shaped and having a bendable and spring biased segment;

third and fourth attachment mechanisms attached to the end portions of the holding member, the third attachment mechanism being disposed a holder distance from the fourth attachment mechanism;

the first attachment mechanism being in operative engagement with the third attachment mechanism and the second attachment mechanism being in operative engagement with the fourth attachment mechanisms so that the blade element is removably and rotatably attached to the holding member and can be selectively rotated with respect thereto;

the holder distance being greater than the blade distance so that the blade element is subjected to a tensile force when the first attachment mechanism of the blade element is attached to the third attachment mechanism of the holding member and the second attachment mechanism of the blade element is attached to the fourth attachment mechanism of the holding member and an arm in operative engagement with the holding member, the arm being spring biased and cooperating with the holding member so that a spring biased force by the arm provides a tensile force on the blade element as the blade element is being pressed against the surface.

2. The wiper blade apparatus according to claim 1 wherein the holding member has an upper surface defining a cavity, the cavity facing away from the blade element.

3. The wiper blade apparatus according to claim 2 wherein a wind member is attached to the holding member between the cavity and one of the end portions of the holding member and the holding member is provided with at least two bendable zones so that the zones are disposed on each side of an attachment point of the arm to the holding member.

4. The wiper blade apparatus according to claim 1 wherein the holding member comprises a bendable zone.

5. The wiper blade apparatus according to claim 1 wherein the blade element is triangular shaped so that blade edges are disposed at outer ends of the triangular shaped blade element.

6. The wiper blade apparatus according to claim 1 wherein the blade element has a central portion and a plurality of blade elements that extend radially outwardly therefrom.

7. The wiper blade apparatus according to claim 1 wherein the blade element has eight blade edges.

8. The wiper blade apparatus according to claim 1 wherein the blade element has a core that is embedded in a rubber material.

9. The wiper blade apparatus according to claim 1 wherein the blade element has a core that is embedded in a plastic material.

* * * * *